United States Patent
Kenny

[15] 3,688,776
[45] Sept. 5, 1972

[54] DEMAND CARDIAC PACER WITH FAST RATE FOR INDICATING INTERFERENCE

[72] Inventor: John Kenny, Welwyn Garden City, England

[73] Assignee: Devices Limited, Welwyn Garden City, England

[22] Filed: Oct. 13, 1970

[21] Appl. No.: 80,414

[30] Foreign Application Priority Data
Oct. 13, 1969   Great Britain..........50,239/69

[52] U.S. Cl..............................................128/419 P
[51] Int. Cl...............................................A61n 1/36
[58] Field of Search....................128/419 P, 419–422

[56] References Cited
UNITED STATES PATENTS

| | | | |
|---|---|---|---|
| 3,433,228 | 3/1969 | Keller, Jr. | 128/419 P |
| 3,460,542 | 8/1969 | Gemmer | 128/419 P |
| 3,557,796 | 1/1971 | Keller, Jr. | 128/419 P |

*Primary Examiner*—William E. Kamm
*Attorney*—Wenderoth, Lind & Ponack

[57] ABSTRACT

A cardiac demand device having a pulse generator with an inherent rate appreciably higher than the natural heartbeat rate and a feedback path for reducing the output rate to the natural heart-beat rate under normal conditions. An interference detector renders the feedback path inoperative to give the high inherent (warning) rate when electrical interference is present.

6 Claims, 2 Drawing Figures

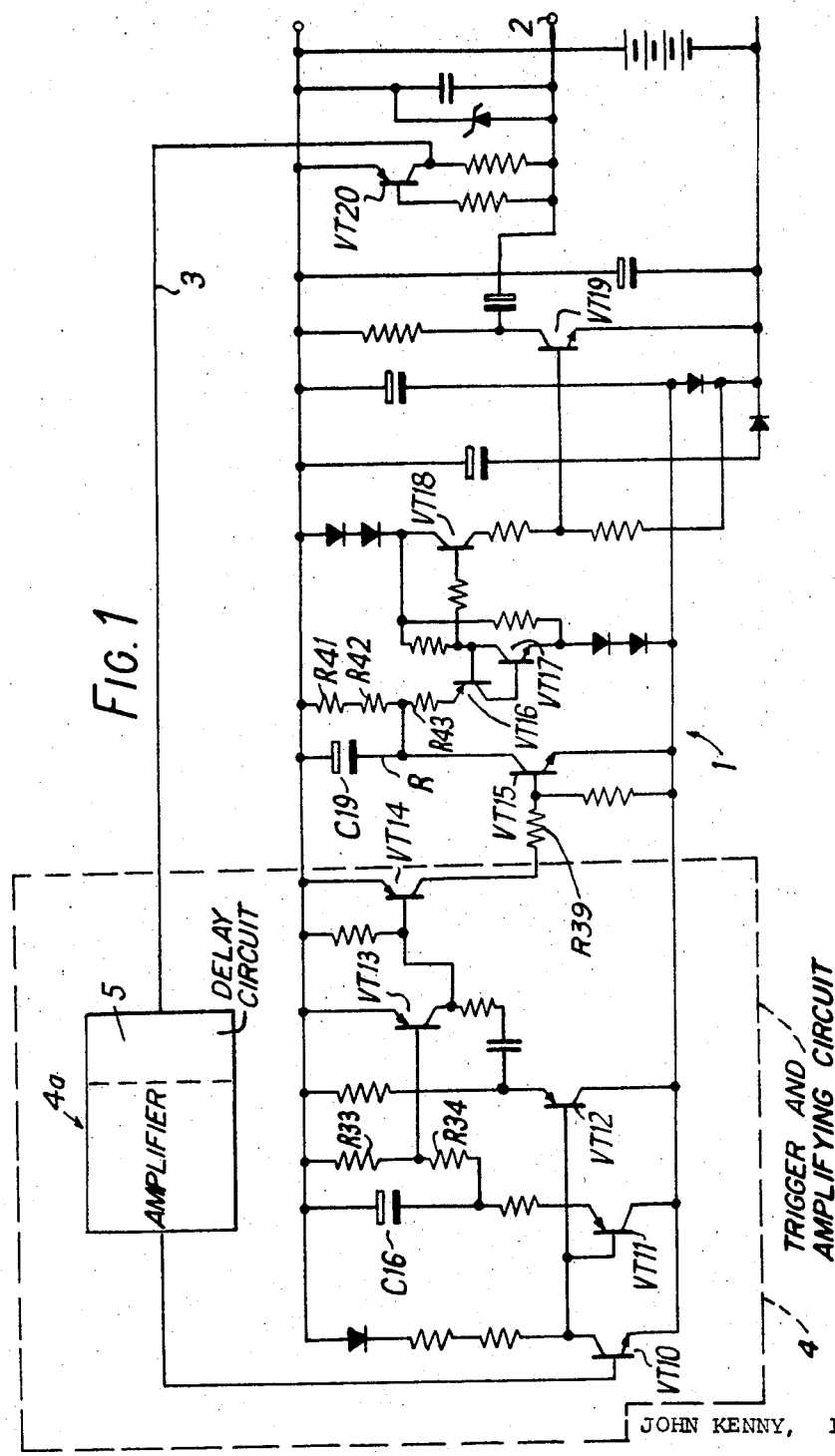

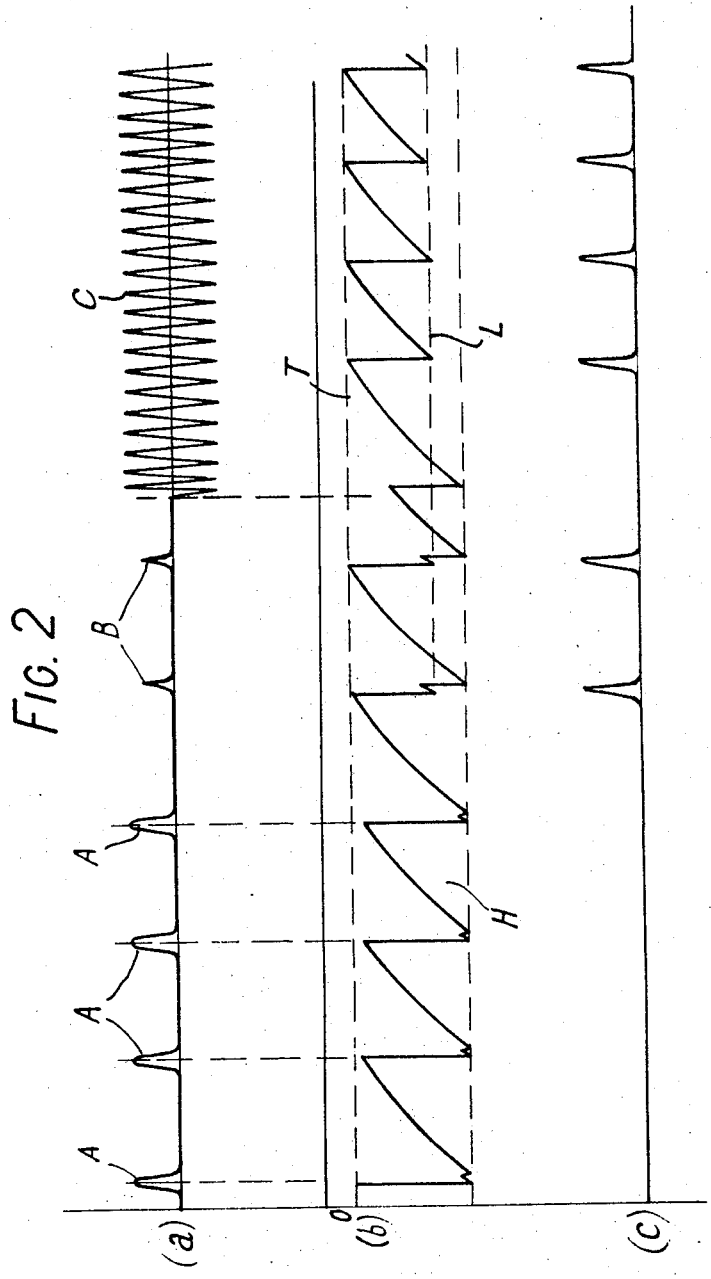

DEMAND CARDIAC PACER WITH FAST RATE FOR INDICATING INTERFERENCE

The invention relates to a Cardiac pacer for artificially generating stimulating pulses for the heart and in particular relates to a demand Cardiac pacer whereby pulses are generated only when natural heartbeats stop or slow appreciably.

The invention is related to the problem of the effects of electrical interference on such devices and although it is applicable to devices external to the body it is particularly applicable to implanted devices. It is found that with known demand cardiac pacers electrical interference of a severe nature can have the effect of inhibiting the generation of stimulating pulses, whether the heart is beating naturally or not.

In order to overcome this difficulty it is possible to provide an interference detector which is effective, on detection of interference, to switch the circuit to generate stimulating pulses at a fixed rate, regardless of whether the heart is beating naturally or not. It is advisable to ensure that the fixed rate is appreciably higher than the natural heart rate in order to prevent conflict between natural and artificial stimulating pulses when the heart is beating naturally. Such conflict can cause heart fibrilation. Thus, a modifying circuit may be provided which is effective, on being switched in by the interference detector, to increase the inherent rate of the pulse generator. A disadvantage of such an arrangement is that failure of the modifying circuit or failure of the inhibiting circuit gives rise to pulses at the inherent rate of the pulse generator which is very close to the natural heart rate and which may therefore cause conflict between natural and artificial stimulating pulses. The present invention seeks to provide a demand cardiac pacer which overcomes this difficulty.

According to the invention there is provided a demand cardiac pacer having a pulse generator for generating heart stimulating pulses, the pulse generator having an inherent rate appreciably higher than the natural heart beat rate, a feedback path which feeds signals from the output of the pulse generator to a rate control point in the pulse generator, the pulse rate from the pulse generator being thereby reduced to a rate approximately the same as the natural heartbeat rate while the feedback path is operative, inhibiting means for inhibiting the stimulating pulses in response to detection of natural heartbeats by applying inhibiting signals through at least part of the feedback path and interference detector means in the said part of the feedback path and effective on detection of electrical interference to render the feedback path inoperative.

This arrangement has the advantage of a "fail safe" characteristic because the inherent rate of the device is high and the initial stages of the device circuit which comprise the feedback path are effective to reduce the rate. Thus, if there is interference or a failure in the initial stages of the circuit the result will be that the device reverts to its safety mode, giving its inherent high output rate. An advantage is that the wearer of the device is able to detect when the high rate pulses are being generated. He therefore knows that he is either in an interference field or that for some other reason the initial stages of the cardiac pacer have failed. It is therefore possible to remedy the defect quickly.

The high pulse rate should be significantly higher than the normal pulse rate and a difference of the order of 40 percent is preferred. For example, the normal rate might typically be about 70 pulses per minute and the high pulse rate about 90 to 110 pulses per minute.

Preferably the oscillator is a relaxation oscillator comprising a timing capacitor which is periodically charged and discharged and the feedback path is effective to control the initial charge on the timing capacitor. This arrangement is also convenient for allowing inhibition of the oscillator on detection of natural heart signals, the occurrence of natural heart signals being sufficient to prevent the full charge or discharge of the timing capacitor which is required for the generation of a stimulating pulse.

The invention will further be described with reference to the accompanying drawings, of which:

FIG. 1 is a circuit diagram of a demand cardiac pacer accordance with the invention; and FIG. 2 is a waveform diagram illustrating the function of the circuit of FIG. 1.

Referring to FIG. 1 the device comprises a pulse oscillator 1 having transistors VT16 and VT17 connected to an RC circuit including a capacitor C19 and resistors R41 and R42. In each cycle of operation the charge on timing capacitor C19 decays through resistors R41, R42 until a predetermined level is reached at which transistors VT16 and VT17 are triggered to conduct. This gives an output stimulating pulse from the circuit and also the charge on capacitor C19 is restored through resistor R43 and transistors VT16, VT17 to an initial level. The cycle is then repeated. The component values of the circuit are such that the inherent repetition rate is 90 pulses per minute. The output pulses from the pulse oscillator 1 are passed through amplifying transistors VT18, VT19 and a limiting transistor VT20 and applied to an electrode 2 which is inserted in or on the heart.

Although the natural frequency of oscillator 1 is 90 pulses per minute there is a feedback path including lead 3 from the output of transistor VT20 to the input of a trigger and amplifying circuit 4 which includes a delay circuit 5 which gives a delay of some 2 milliseconds and an amplifier 4a. The output from trigger and amplifying circuit 4 is applied through a resistor R39 to the base of a transistor VT15 in series with capacitor C19. Pulses fed back through the feedback loop to the base of transistor VT15 causes the transistor to conduct and thereby increase the initial charge of capacitor C19 in each cycle, as compared with the charge which this capacitor would receive initially if transistor VT15 did not conduct. The increased charge has the effect of reducing the pulse oscillator frequency from 90 pulses per minute to 70 pulses per minute. Thus, under normal circumstances the operational frequency of the circuit is 70 pulses per minute.

Normal electrical activity of the heart is detected by the electrode 2 and the natural heart stimulating signals give rise to corresponding natural signals applied over the feedback lead 3 to trigger and amplifying circuit 4. The effect of each of these natural signals is to cause transistor VT15 to conduct and thereby charge capacitor C19 fully. Normally, the heart will beat more rapidly than at 70 pulses per minute and therefore capacitor C19 will be recharged fully in each cycle shortly before it would have discharged sufficiently to trigger the pulse oscillator to give an artificial stimulating pulse. Therefore, while the heart is beating normally no artificial pulses are generated by the pulse oscillator. If the heart slows down or stops capacitor C19 will be allowed to discharge enough to generate an artificial stimulating pulse. Thereafter, if there is no further natural heart activity the stimulating pulses will repeat at a frequency of 70 pulses per minute.

Trigger and amplifying circuit 4 includes an interference detector circuit comprising a capacitor C16 and resistors R33 and R34. This circuit is connected in series in the feedback path, being connected to receive the output from an amplifying and rectifying transistor VT11 in trigger and amplifying circuit 4. Capacitor C16 tends to be charged by the output from transistors VT11 and discharged by the path through resistors R33 and R34. The amount of charge on capacitor C16 determines the state of conduction of a gating transistor VT13, the base of which is connected to the junction between resistors R33 and R34. The value of the components is so chosen that VT13 conducts for 200mSec. after each natural or artificial pulse. For relatively low frequency signals of the order of 70 or 90 pulses per minute, transistor VT13 ceases to conduct after 200mSec. However, if the circuit should be subject to electrical interference picked up from external sources then capacitor C16 will be charged up more frequently. This is because electrical interference signals are of a relatively high frequency. Thus, if signals are passed through the circuit of a frequency of about 5 pulses per second or higher than capacitor C16 charges sufficiently often to make the transistor VT13 conduct continuously.

Feedback and inhibiting pulses are passed from the output of transistor VT10 through transistors VT12 and VT14 to transistor VT15. Transistor VT13 offers a by-pass for such pulses and when this transistor is made to conduct in response to detected interference the pulses are by-passed to signal earth and the feedback path is effectively blocked. Transistor VT15 does not conduct under these circumstances and the pulse oscillator 1 is allowed to run at its inherent rate of 90 pulses per minute. Corresponding artificial stimulating pulses are thus given to electrode 2 but since these are of a relatively high frequency they do not conflict with the natural heart stimulating pulses so that synchronism of the heart action is not destroyed.

Referring now to FIG. 2 there is shown at (a) a typical input waveform on line 3 (FIG. 1). Four natural heartbeats give inhibit pulses A. The heart then stops beating naturally and the device takes over and starts to give stimulating pulses at a rate of 70 pulses per minute. The feedback pulses are shown at B. Then electrical interference (for example main pick-up) is experienced at C. At (b) there is shown the corresponding potentials on the electrode R (FIG. 1) of capacitor C19 with respect to the other capacitor electrode taken to be at zero volts. The level at which transistor VT16 triggers is shown at T and it will be seen that this level is not reached while the heart is beating at more than 70 pulses per minute. The inhibit signals from the heart cause transistor VT15 to conduct and recharge the capacitor to a high initial level H.

When there is no inhibit pulse, the trigger level T is reached and a stimulating pulse is generated, the capacitor C19 being recharged to a low initial level L through transistors VT16 and VT17. However a portion of the output pulse is fed back around the feedback path 3 and after a delay of 2mSec it causes transistor VT15 to conduct and raise the charge on the capacitor C19 to the high level H. In this way the pulse oscillator continues to run at 70 pulses per minute.

When interference is experienced the interference signals are initially passed along the feedback path and act in the same way as an inhibit signal, causing the capacitor C19 to recharge to the high level. However, the effect of the rectified interference signal on capacitor C16 is to charge the capacitor to mean level which causes transistor VT13 to conduct continuously. This blocks the feedback path. Thus when capacitor C19 has discharge to level T to give the next stimulating pulse, it is re-charged only to the low initial level L. Subsequent discharge to level T is then relatively quick and the pulse oscillator proceeds at 90 pulses per minute until the feedback path is unblocked by removal of the interference. The output stimulating pulses are shown at (c) in FIG. 2.

If interference signals of a very high frequency are received the circuit may behave differently, although achieving the same results. For example, a radio frequency unmodulated signal of sufficient amplitude will render the amplifier inoperative because of continuous overload. The feedback loop is thereby broken. If the high frequency interference is amplitude modulated there may be an additional effect to the overload. This is that non-linearity in the amplifier may demodulate the interference signals to provide lower frequency interference signals which act to block the amplifier in the manner previously described.

It will be understood that even if the heart is beating naturally, the effect of interference will be to induce a fixed rate output from the device at 90 pulses per minute until the interference is removed.

The invention is not restricted to the details of the foregoing description of one embodiment of the invention. For example, inhibit signals may be derived from a separate electrode system or even from a pressure transducer responsive to blood flow in an artery of or vein. It is only necessary that the inhibit signals be passed through that portion of the feedback path which may be blocked by detection of interference. Furthermore, the pulse generator may be of an equivalent type to that shown specifically. For example, instead of discharging slowly to a trigger level, the capacitor may be arranged to charge slowly to a trigger level from a variable starting point, being discharged to the starting point at the end of each cycle.

The means for detecting interference and rendering the feedback path inoperative in response thereto may differ from that described with reference to the drawings, although it is generally convenient to distinguish interference signals by their relatively high frequency components and therefore to use a frequency responsive circuit of some kind as the interference detector.

I claim:

1. A device for artificially generating simulating heart pulses on demand, said device comprising a pulse generator for generating heart stimulating pulses, said pulse generator having an inherent rate appreciably higher than the natural heartbeat rate, a rate control point in said pulse generator, a feedback path which feeds signals from the output of said pulse generator to said rate control point, means responsive to signals applied to said rate control point from said feedback path to reduce the pulse rate from said pulse generator to a rate approximately the same as said natural heartbeat rate, inhibiting means for inhibiting the stimulating pulses in response to detection of natural heartbeats by applying inhibiting signals through at least part of said feedback path, and interference detector means in the said part of said feedback path and effective on detection of electrical interference to render said feedback path inoperative.

2. A demand device as claimed in claim 1, wherein said feedback path has a cut-off device and said interference detector means comprises a frequency response circuit effective to trigger said cut-off device to block said feedback path if the signals in said feedback path are of a high frequency relative to said stimulating pulse rate.

3. A demand device as claimed in claim 2, wherein said cut-off device is a transistor gate which by-passes said feedback path when it is actuated by said frequency responsive circuit.

4. A demand device as claimed in claim 2, wherein said frequency responsive circuit comprises a capacitor having a resistive discharge path and a charging path whereby said capacitor is charged, a rectifier which receives signals from said feedback path and applies them, after rectification, to said charging path to charge said capacitor, said cut-off device being operated by the voltage across said capacitor to block said feedback path when said capacitor is charged sufficiently frequently that it does not fall below a predetermined level of charge.

5. A demand device as claimed in claim 1, wherein said pulse generator comprises a relaxation oscillator; a timing capacitor for said relaxation oscillator; a discharge path for said timing capacitor; a first charging path for said timing capacitor; an alternative charging path for said timing capacitor; a trigger circuit connected to said capacitor so as to be triggered thereby to conduct and give an output stimulating pulse when said timing capcitor has discharged to a predetermined level, said timing capacitor being thereupon normally re-charged through said first charging path to an initial level; a triggerable control device responsive to an inhibit pulse or a feedback pulse in said feedback path to open said alternative charging path; and a charging source connected to said alternative charging path so that when said alternative charging path is open the charge on said timing capacitor being thereby raised to a second initial level higher than said first-mentioned initial level.

6. A demand device as claimed in claim 1, further comprising an output electrode for the application of stimulating pulse to the heart, said output electrode being connected to said feedback path and being effective to apply thereto inhibit pulses from the heart, the whole feedback path thus conveying both feedback stimulating pulses and inhibit pulses.

* * * * *